United States Patent
Steele

(10) Patent No.: US 6,840,186 B1
(45) Date of Patent: Jan. 11, 2005

(54) CLEAT

(75) Inventor: Alin E. Steele, Novi, MI (US)

(73) Assignee: Steele Development Group, Ltd., Novi, MI (US)

( * ) Notice: Subject to any disclaimer, the term of this patent is extended or adjusted under 35 U.S.C. 154(b) by 0 days.

(21) Appl. No.: 10/619,530

(22) Filed: Jul. 15, 2003

(51) Int. Cl.[7] .............................................. B63B 21/04
(52) U.S. Cl. ....................................... 114/218; 182/92
(58) Field of Search .......................... 114/218; 182/90, 182/92, 133, 136; 294/158, 165, 170

(56) References Cited

U.S. PATENT DOCUMENTS

| | | | |
|---|---|---|---|
| 3,905,322 A | | 9/1975 | Peterman et al. ............ 114/218 |
| 4,373,463 A | | 2/1983 | Beaudette ..................... 114/218 |
| D287,097 S | | 12/1986 | Nelson ........................ D8/382 |
| 4,719,773 A | | 1/1988 | Alberts ........................... 70/18 |
| 5,216,972 A | | 6/1993 | Dufrene et al. .............. 114/218 |
| 5,477,801 A | | 12/1995 | Lawrence .................... 114/218 |
| 5,695,234 A | * | 12/1997 | Coticchio et al. ............. 294/158 |
| 5,709,424 A | * | 1/1998 | Schuler ........................ 294/165 |
| 5,810,113 A | * | 9/1998 | Jones ............................ 182/92 |
| 5,951,080 A | * | 9/1999 | Wessner .................... 2594/165 |
| D432,395 S | | 10/2000 | Whitley ....................... D8/356 |
| D453,916 S | | 2/2002 | Adams ....................... D12/317 |
| 6,487,984 B1 | | 12/2002 | Pape et al. .................... 114/218 |

OTHER PUBLICATIONS

"SHIP GRIP"—Photograph of Suction Cleat.
Chain Clear, Mallard Marine Limited—"Innovative Products for Mariners" www.mallardmarine.ca/.
"The Gripper" photograph.
"Rail Fender Hanger" photograph and description www.taylormadeproducts.cc/2002catalog/catalog11a.htm.
Welcome to the BoatU.S. Online Store! www.boatus–store.com/browse/otem.asp711D=20292.
Portable Dock Ring—Davis Instruments (photograph and description) www.davisnet.com.
Flip Up Ring and Insta Cleat (photographs and descriptions) 2 Sheets, Dock Edge, ®2002 www.dockedge.com/Products/Cleats/2603W–F.html.
Assorted Cleats Catalog pictures and descriptions (pp. 302–306).

* cited by examiner

Primary Examiner—Lars A. Olson
(74) Attorney, Agent, or Firm—Young & Basile, PC

(57) ABSTRACT

A cleat is adjustably mountable on a support by an attachment strap and a clasp. Alternately, or in combination with the strap, the cleat has a full hand grip surface. Alternately, the cleat can function as an portable article carrier.

15 Claims, 6 Drawing Sheets

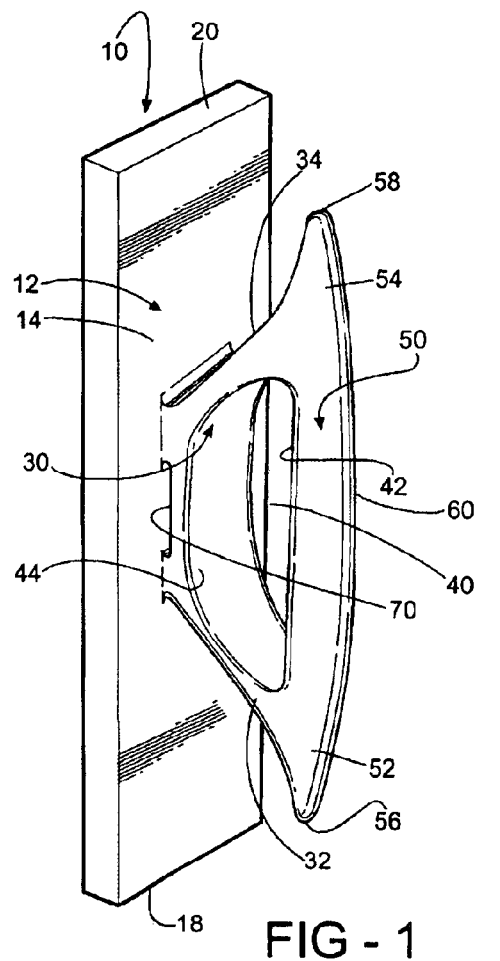
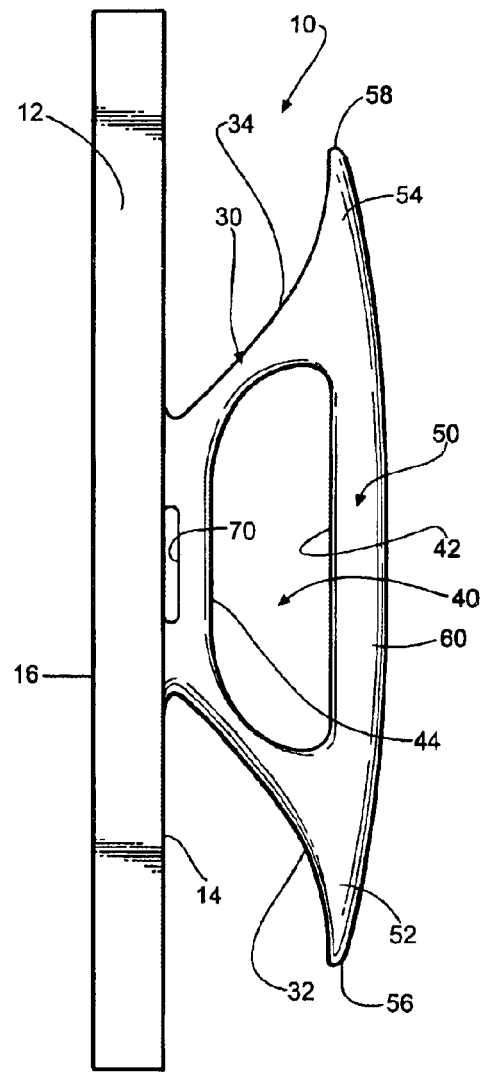
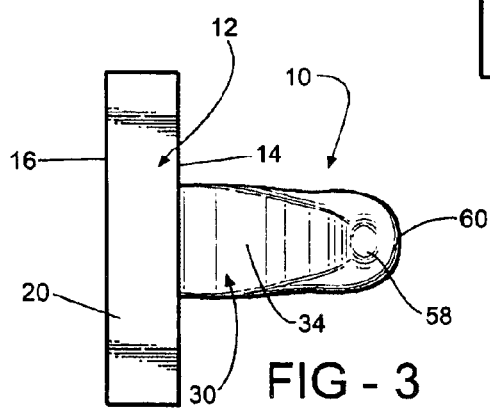

FIG - 4
FIG - 5
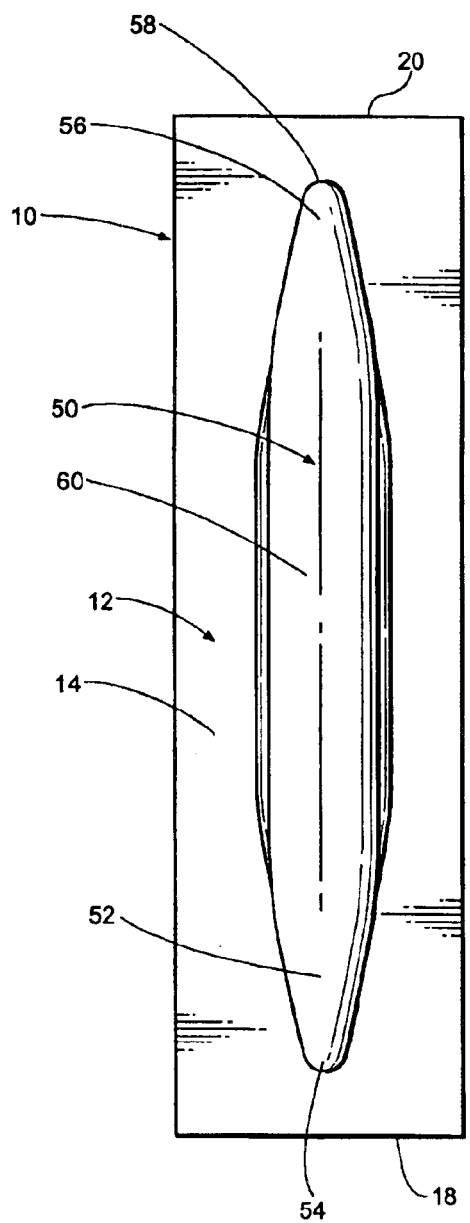
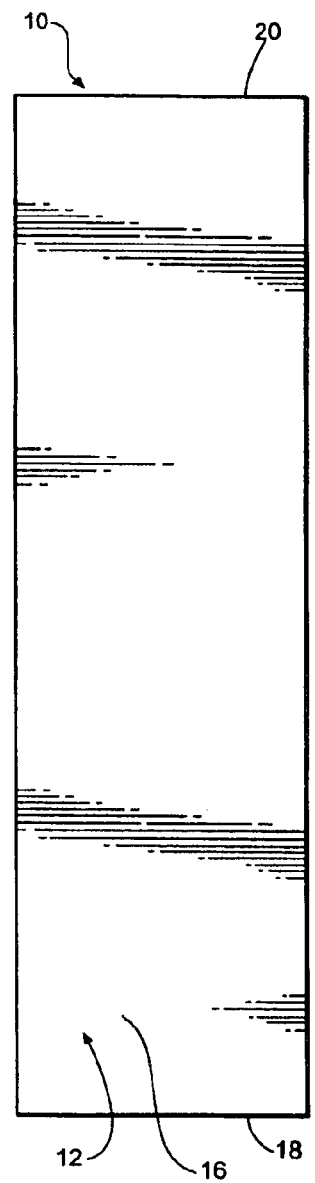

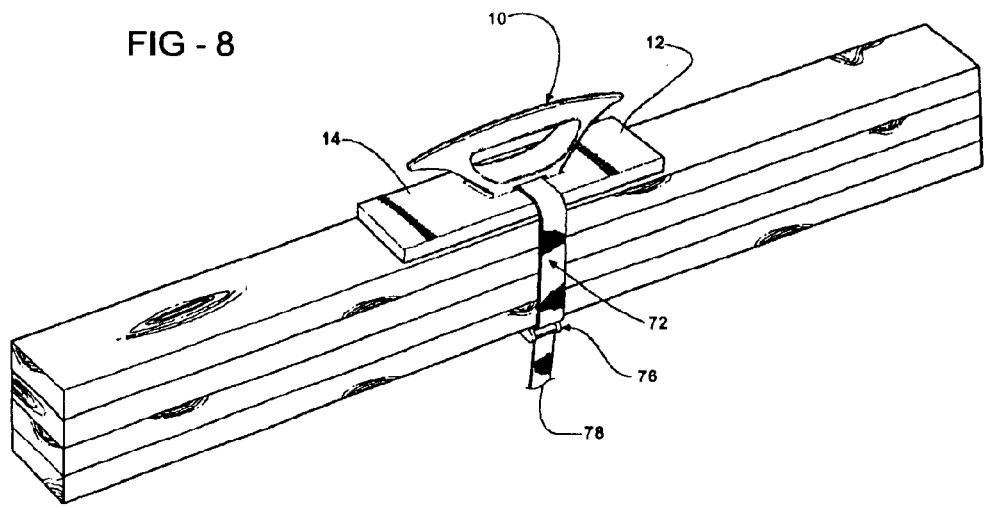

CLEAT

BACKGROUND

Marine cleats are used on docks, piers and seawalls to receive lines or ropes from marine vessels to tie the vessels to the docks.

Such cleats typically have a base, an upstanding leg, and an upper horn portion terminating into laterally extending ends or projections. A line from a boat or a line attached to a cushion, fender, bait basket etc., is wound in a back and forth, knot-like fashion about the leg of the cleat, between the base and the horn projections. The cleats are secured by fasteners through the base to the dock, typically in a horizontal orientation, but are also capable of vertical mounting on dock pier or seawall posts.

Marine cleats typically have an opening in the central portion of the leg for weight and cost reduction purposes.

People occasionally use the cleats as handholds when getting in or out of the boat. However, the projections on the ends of the horn are usually too small to provide a secure handhold. In addition, the opening in the center portion of the leg of many cleats is too small to receive more than a couple of the user's fingers. Thus, previously devised marine cleats do not provide a secure handhold for a person entering or egressing from a boat.

Fluctuating river and lake levels cause the height of a boat tied to a dock or seawall to vary considerably in a vertical direction with respect to the top of the dock or seawall. The fixed mounting of conventional cleats in either horizontal or vertical orientations on a dock, pier or seawall an make it difficult to secure a line to the cleat if the lake or river level falls considerably, or if not optimally positioned for a given boat for use as aids in assisting a person to get into or out of a boat.

Thus, it would be desirable to provide a cleat which addresses the above-noted deficiencies with prior cleats. It would also be desirable to provide a cleat which provides a secure handhold to a person getting into and out of a boat. It would also be desirable to provide a cleat which is moveably mountable on a dock or pier post to accommodate fluctuating water levels and boat rail heights. It would also be desirable to provide a cleat which can be used in multiple applications, including non-marine applications, as an article holder or a handgrip on any vertical support or as an article carrier.

SUMMARY OF THE INVENTION

The present invention is a cleat suitable for multiple applications including marine use, as a holder or grip on any vertical support and as an article carrier.

In one aspect, the cleat includes a leg, a pair of projections extending from the leg, and one of a full hand grip shaped aperture formed in the leg, and means for adjustably mounting the cleat on a support.

In another aspect, the cleat includes a hand grip means formed on the cleat for forming a hand grip surface capable of receiving a full human hand. In one aspect, the handgrip means is formed of the aperture having a size suitable to receive the full hand of a person. The outer surface of the leg or horn portion is generally convex with respect to the base to cooperate in forming a convenient handgrip surface on the cleat.

In another aspect, the mounting means includes a strap coupled to the cleat, and clasp means, attached to the strap, to enable the strap to be tightened about a support to adjustably and releasably mount the cleat in a vertically selectable position on a support. An aperture is formed in one of the leg and the base of the cleat for receiving the strap to enable the strap to be carried unitarily on the cleat.

In another aspect, an optional base is coupled to the leg.

The present cleat overcomes many deficiencies found in prior cleats. The inventive cleat provides a convenient and secure handhold to assist individuals getting into and out of a boat located adjacent to the cleat. The cleat, which is removably mountable on a vertical support, such as a dock or pier post, can be easily transported between use sites or to be adjustably vertically positioned on the post to accommodate fluctuations in water levels, variations in boat rail to dock height or use as a grip or holder on any vertical support.

BRIEF DESCRIPTION OF THE DRAWING

The various features, advantages and other uses of the present invention will become more apparent by referring to the following detailed description and drawing in which:

FIG. 1 is a perspective view of a cleat according to the present invention;

FIG. 2 is a front elevational or view of the cleat shown in FIG. 1;

FIG. 3 is a top plan view of the cleat shown in FIG. 1;

FIG. 4 is a bottom elevational view of the cleat shown in FIG. 1;

FIG. 5 is a left side elevational view of the cleat shown in FIG. 1;

FIG. 8 is a front elevational view of the cleat of FIGS. 1–7 shown in an article carrier application.

DETAILED DESCRIPTION

Figure 6A:
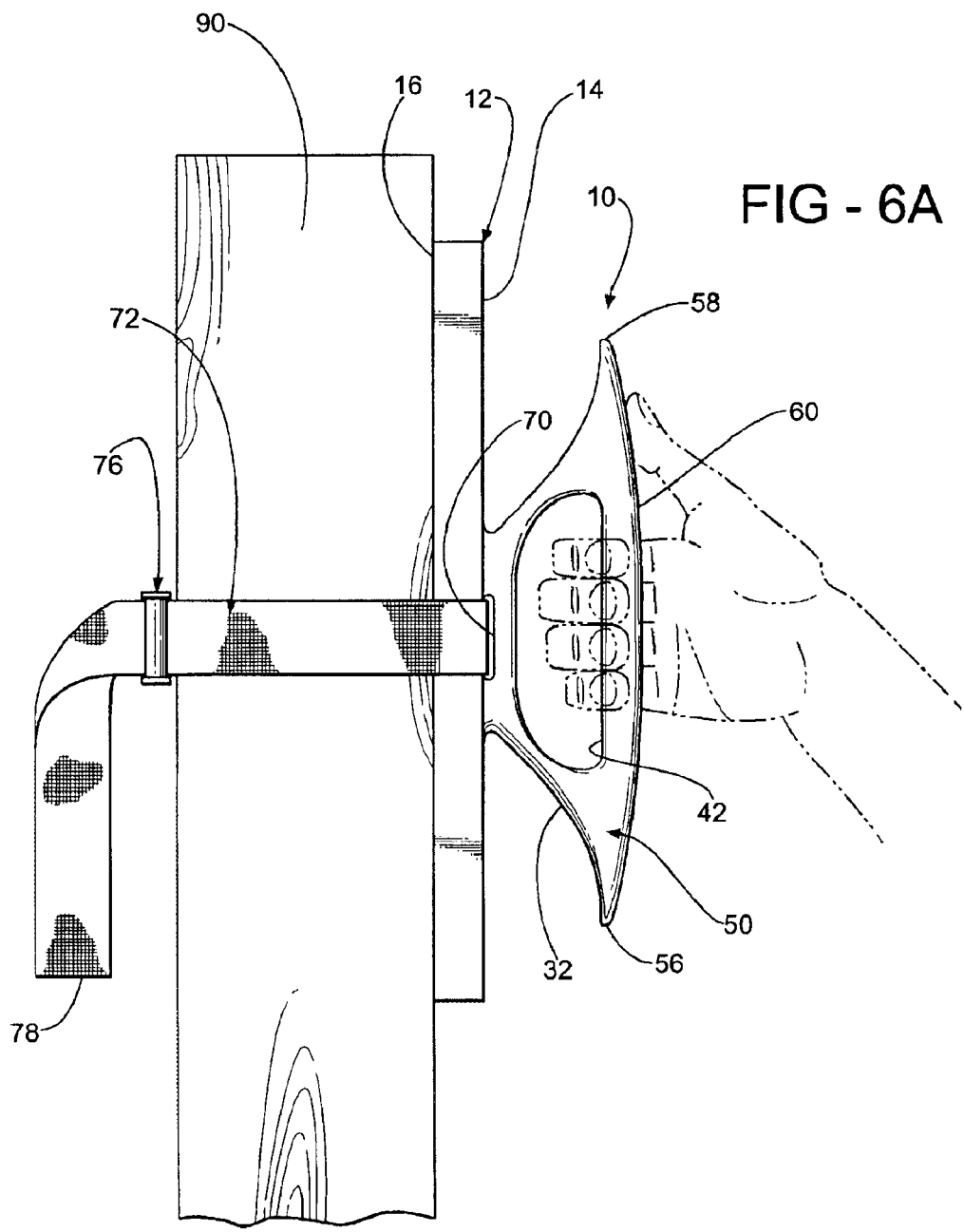
FIGS. 6A and 6B are side elevational views showing the mounting of the cleat of FIG. 1 on a dock post for use as a hand grip and attachment of a line.

Refer now to the drawing, and to FIGS. 1–7 in particular, there is depicted in cleat 10 according to the present invention.

The cleat 10 is formed of a suitable material for use in marine applications. Thus, cleat 10 can be formed of corrosion resistant material, such as a metal including stainless steel, aluminum, coated aluminum, as well as high strength plastics.

As shown in FIGS. 1–6, the cleat 10 is formed of a monolithic, one piece body; although multiple pieces joined together by various fastening methods, including, for example, welding, fasteners, etc., may also be used.

The cleat 10 includes an optional base 12 which may have any suitable peripheral shape, including polygonal, oval, circular, with the rectangular shape shown in FIGS. 1–6 being understood to be by example only.

The base 12 includes a top surface 14, an opposed bottom surface 16 and outer side edges 18 and 20. A plurality of optional through-bores, no shown, can be formed in the base 12 to receive fasteners, such as bolts, etc., to more permanently secure the cleat 10 to a dock, pier seawall or any surface.

A leg 30 extends from the top surface 14 of the base 12, generally centrally of the base 12. The leg 30 has a pair of outer side edges 32 and 34 overlaying the top surface 14 of the base 12. The side edges 32 and 34 may have any suitable shape, such as straight, or the smoothly curved, arcuate shape shown in FIG. 1.

An aperture 40 is formed in the leg 30. The aperture 40 again may have any shape, with a generally semi-circular shape shown in FIG. 1 being by example only. The aperture 40 is formed with a generally planar or slightly curved top surface 42 and an opposed arcuate surface 44. The top surface 42 forms a portion of a handhold or grip surface as described hereafter.

The leg 30 transitions into a horn portion 50. The horn portion 50 includes a pair of outwardly extending projections 52 and 54. The projections 52 and 54 are formed at the distal ends of the side ends 32 and 34 of the leg 30 and are spaced from and overlay the top surface 14 of the base 12. The projections 52 and 54 may have smoothly radiused outer ends 56 and 58, respectively.

The horn portion 50 also has a top surface 60 which extends continuously between the outer ends 56 and 58 of the projections 52 and 54. The top surface 60, which may have any cross-sectioned shape, may have a slightly convex surface with respect to the top surface 14 of the base 12 to combine with the surface 42 of the aperture 40 to form a convenient hand grip surface for the entire hand of a user thereby enabling a secure grip to assist the user in safely and easily entering or exiting a marine vessel.

According to a unique feature of the present invention, the cleat 10 is provided with portable and moveable capabilities which enable the cleat 10 to be releasably and positionally adjustably mounted on a support, such as a dock or pier post.

Thus, the cleat 10 is provided with attachment means for releasably securing the cleat 10 to a vertical member. The attachment means includes a second aperture 70 formed in the cleat 10, either in the leg 30 or in the base 12, or in both leg 30 and the base 12 spanning the juncture of the leg 30 and the base 12.

The aperture 70 receives a strap 72. The strap 72 is formed of a material suited for marine environments, such as nylon, for example. The strap 72 has a first end 74 which is wrapped around one end of a releasable clasp means 76 and secured to itself in a loop 84 by adhesive, stitching, fasteners, or combinations thereof. The other free end of the strap 72 is insertable and moveable through a moveable clamp member 80 of the clasp 74. The clamp member 80 is carried in a body 82 which also carries the opposed loop 84 at the first end 74 of the strap 72. The clamp member 80 may be an over-center toggle member to provide added securing force to tightly secure the strap 72 around a dock post 90 in the desired position.

Figure 6B:
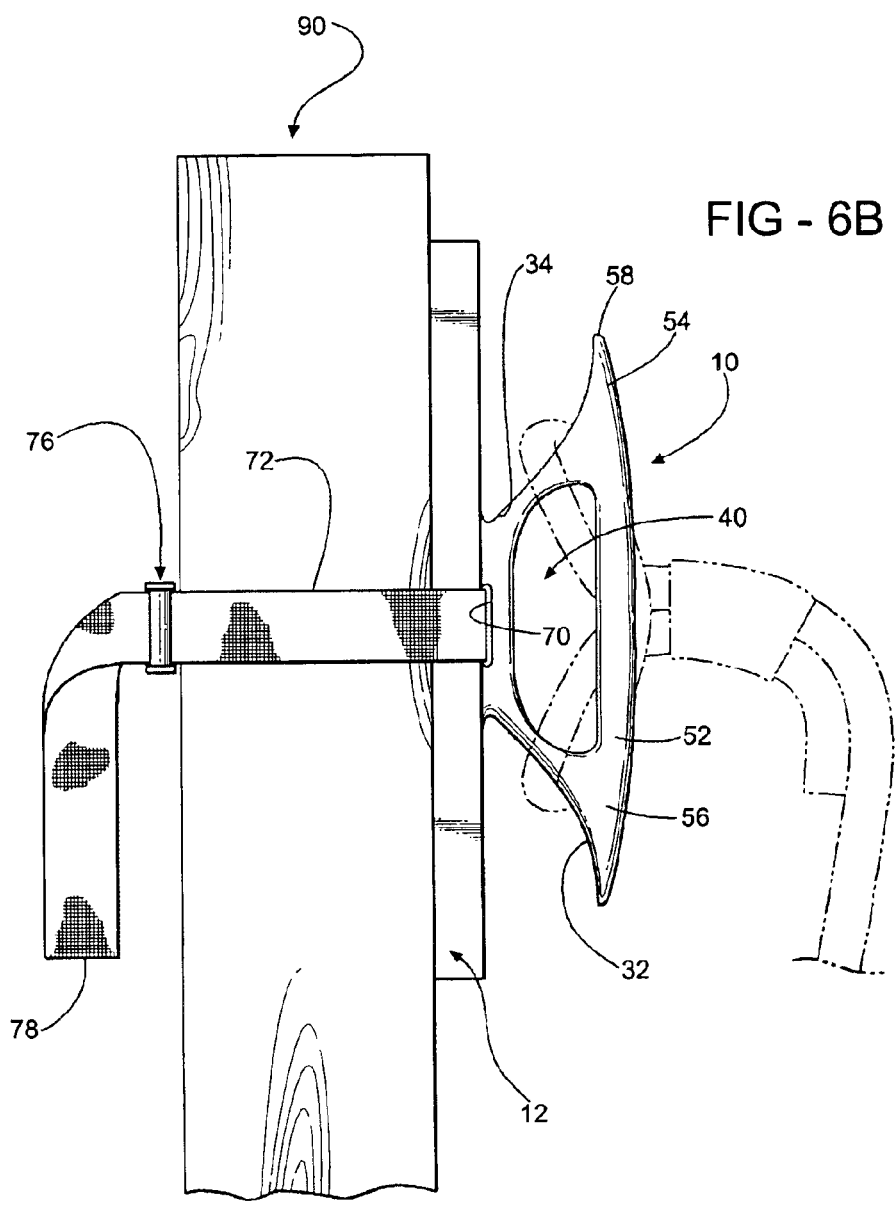
Figure 7:
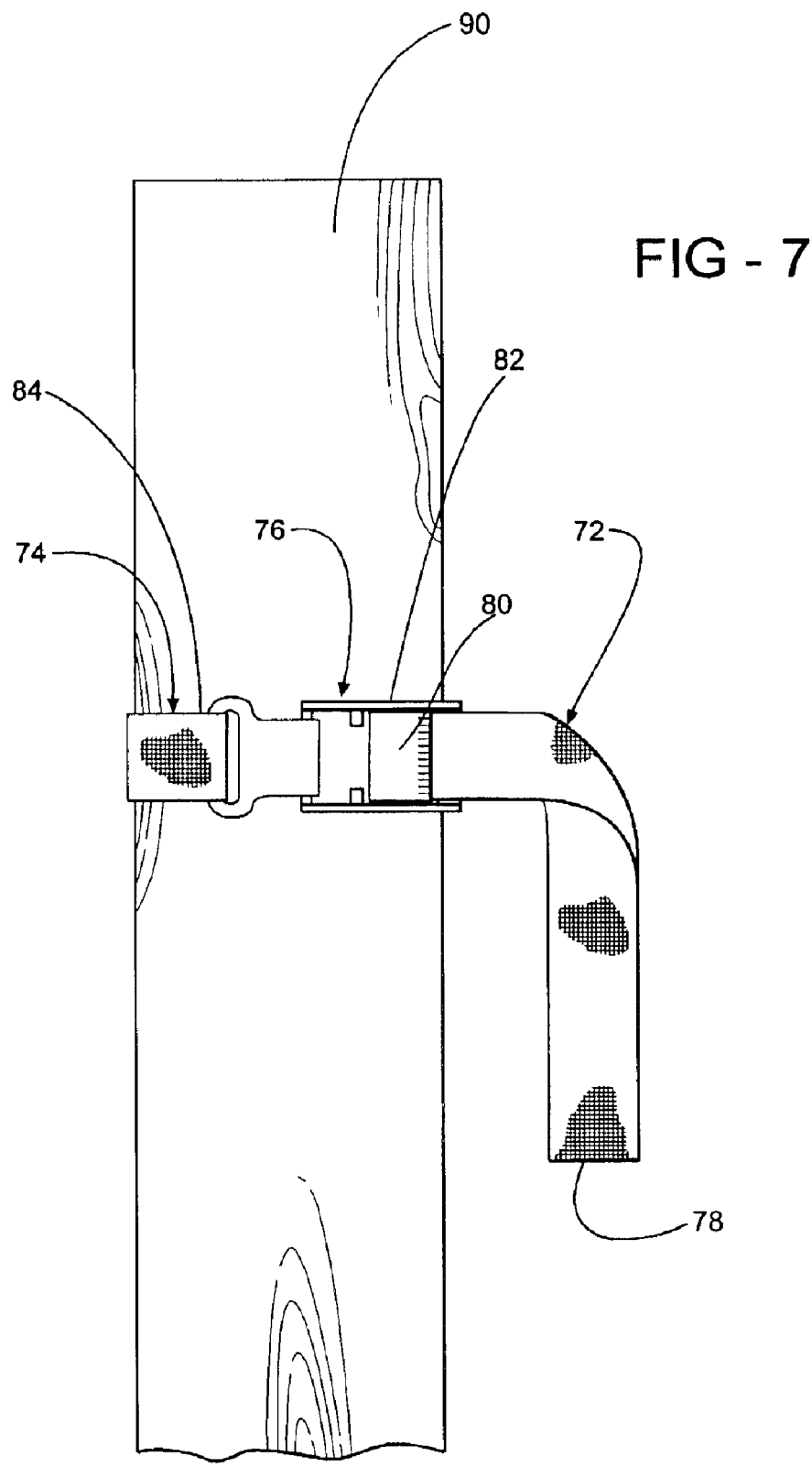
FIG. 7 is a rear elevational view of the cleat shown in FIG. 6.

Use of the cleat 10 can be seen in FIGS. 6A, 6B and 7. With the strap 72 inserted through the aperture 70 in the class 76, the clasp 76 is vertically positioned at the desired height on a dock post 90. The free end 78 of the strap 72 which has been or is now it is then inserted through the aperture 70 in the clasp 76 adjacent the clamp member 80 and pulled to the desired tightness to tightly wrap the strap 72 about the dock post 90. The clamp member 80, which may be formed with a serrated edge, teeth, or other projections, resists outward loosening movement of the free end 78 of the strap 72.

In this vertical position, the cleat 10 is ideally positioned for cleating off a line by wrapping the line in figure eight loops about the leg 30 and the horns 50, to secure a boat, fenders, bait baskets, cushions, etc., as seen in FIG. 6B, to a post. More importantly, the cleat 10 is ideally positioned for use as a handhold surface to assist a person in entering or exiting a marine vessel as depicted in FIG. 6A. The hand grip surface formed by the aperture 40 and the adjacent horn portion 50 enables a person to grab the cleat 10 using his or her full hand. At the same time, the vertical position of the cleat 10 can be adjusted to accommodate fluctuating water levels, different height boat railings, etc.

The cleat 10 can also be removed entirely from the post 90 and carried remounted on another post on the same or different dock. This enables the user of a marine vessel to apply the cleat 10 to any dock post or other easily accessible support in order to tie up a marine vessel in any desired location.

The cleat 10 can be used in non-marine applications since it can be secured to any vertical and/or horizontal member, such as a post in a construction site, a tree limb, etc., to function as an article holder and/or as a hand grip.

Refer now to FIG. 8, there is depicted an alternate use of the cleat 10 of the present invention as an article carrier. The strap 72 is tightened about the articles, for example, boards, poles, water skis, etc. The handgrip means on the cleat 10 provides a secure gripping surface to enable the user to carry the articles usually one handed, with the articles securely held together by the strap 72.

In conclusion, there has been disclosed a marine cleat which provides a convenient and secure handgrip surface to assist a person in entering or exiting a marine vessel. The cleat 10 is also vertically positionable and mountable on a dock post to accommodate fluctuations in water levels as well as different height boat railings with respect to an adjacent dock, pier or seawall. The cleat also is useable as an article carrier.

What is claimed is:

1. A cleat comprising:

a leg;

a pair of projections extending from the leg; and a hand grip aperture formed in the leg; and means for adjustably mounting the cleat on a support, the mounting means including a strap and a slot formed in the cleat for receiving the strap.

2. The cleat of claim 1 wherein the mounting means comprises:

the full handgrip aperture formed in the leg disposed adjacent to a horn portion, with the pair of projections extending from the horn portion.

3. The cleat of claim 2 wherein:

the horn portion has a generally convex outer surface.

4. The cleat of claim 3 wherein the mounting means comprises:

clasp means attached to the strap to enable the strap to be tightened about a support.

5. The cleat of claim 1 wherein:

outer side edges of the leg have an arcuate shape.

6. The cleat of claim 1 wherein:

the aperture in the leg has a surface with the length to receive four fingers of a human hand.

7. The cleat of claim 1 wherein the mounting means further comprises:

clasp means attached to the strap to enable the strap to be tightened about a support.

8. The cleat of claim 1 further comprising:

a base, the leg extending from the base.

9. The cleat of claim 8 wherein:

the hand grip aperture is formed in at least one of the leg and the base for receiving the strap.

10. The cleat of claim 8 wherein:

the base and the leg are monolithic.

11. A cleat comprising:

a leg;

a pair of projections extending from the leg;

hand grip means formed on the cleat for forming a hand grip surface capable of receiving a full human hand, the handgrip means being an aperture in the leg having a surface with the length to receive four fingers of a human hand; and an outer surface of the leg having a substantially convex surface shape.

12. The cleat of claim 11 further comprising:

side edges of the leg having an arcuate shape.

13. The cleat of claim 11 further comprising:

a base, the leg extending from the base.

14. The cleat of claim 13 wherein:

the base and the leg are monolithic.

15. A cleat comprising:

a leg, an outer surface of the leg having a substantially convex surface shape;

a pair of projections extending from the leg;

hand grip means formed on the cleat for forming a hand grip surface capable of receiving a full human hand, the hand grip means being an aperture in the leg having a surface with the length to receive four fingers of a human hand;

a strap attachable to the leg; and clamp means, carried on the strap, for tightly wrapping the strap about a support.

* * * * *